(12) United States Patent
Mack-Crane et al.

(10) Patent No.: US 8,885,643 B2
(45) Date of Patent: Nov. 11, 2014

(54) METHOD FOR MULTICAST FLOW ROUTING SELECTION

(71) Applicant: Futurewei Technologies, Co., Plano, TX (US)

(72) Inventors: T. Benjamin Mack-Crane, Downers Grove, IL (US); Peter Ashwood-Smith, Quebec (CA)

(73) Assignee: Futurewei Technologies, Inc., Plano, TX (US)

( * ) Notice: Subject to any disclaimer, the term of this patent is extended or adjusted under 35 U.S.C. 154(b) by 44 days.

(21) Appl. No.: 13/648,151

(22) Filed: Oct. 9, 2012

(65) Prior Publication Data

US 2013/0114595 A1  May 9, 2013

Related U.S. Application Data

(60) Provisional application No. 61/555,992, filed on Nov. 4, 2011.

(51) Int. Cl.
*H04L 12/28* (2006.01)
*H04L 12/753* (2013.01)
*H04L 12/761* (2013.01)
*H04L 12/18* (2006.01)
*H04L 12/721* (2013.01)

(52) U.S. Cl.
CPC .............. *H04L 12/185* (2013.01); *H04L 45/48* (2013.01); *H04L 45/66* (2013.01); *H04L 45/16* (2013.01)
USPC ........................................................ 370/390

(58) Field of Classification Search
USPC ......... 370/203, 204–215, 229–240, 310–337, 370/338–350, 351–394, 395.1, 395.3, 370/395.4, 395.41, 395.42, 395.5, 395.52, 370/431–457, 458–463, 464–497, 498–522, 370/523–520, 521–529
See application file for complete search history.

(56) References Cited

U.S. PATENT DOCUMENTS

| 2008/0101360 | A1  | 5/2008  | Napierala |
| 2010/0067528 | A1* | 3/2010  | Napierala ................... 370/390 |
| 2011/0255536 | A1* | 10/2011 | Liu et al. ..................... 370/390 |
| 2013/0077625 | A1* | 3/2013  | Khera et al. ................ 370/390 |

OTHER PUBLICATIONS

Fedyk, D., et al., "IS-IS Extensions Supporting IEEE 802.1aq Shortest Path Bridging," draft-ietf-isis-ieee-aq-05.txt, Mar. 8, 2011, 41 pages.
Fenner, B., et al., "Protocol Independent Multicast—Sparse Mode (PIM-SM): Protocol Specification Revised," RFC 4601, Aug. 1, 2006, 150 pages.
"Virtual Bridged Local Area Networks—Amendment: Equal Cost Multiple Paths (ECMP)," IEEE P802.1 Qbp/D0.1, Oct. 13, 2011, 58 pages.

(Continued)

*Primary Examiner* — Jung-Jen Liu
(74) *Attorney, Agent, or Firm* — Conley Rose, P.C.; Grant Rodolph; William H. Dietrich (57) ABSTRACT

A network component comprising a memory coupled to a processor, wherein the memory comprises instructions that cause the processor to select a first multicast routing mode from a plurality of multicast routing modes supported by a network comprising the network component, assign the first multicast routing mode to a first multicast flow, and advertise a first information frame to a first plurality of nodes, wherein the first information frame provides the assignment of the first multicast routing mode to the first multicast flow.

18 Claims, 5 Drawing Sheets

(56) References Cited

OTHER PUBLICATIONS

Foreign Communication From a Counterpart Application, PCT Application PCT/US2012/063554, International Search Report dated Apr. 26, 2013, 7 pages.

Foreign Communication From a Counterpart Application, PCT Application PCT/US2012/063554, Written Opinion dated Apr. 26, 2013, 12 pages.

"Draft Standard for Local and Metropolitan Area Networks—Media Access Control (MAC) Bridges and Virtual Bridged Local Area Networks—Amendment XX: Shortest Path Bridging," IEEE P802.1aq/D 4.6, Feb. 10, 2012, 363 pages.

"Draft Standard for Local and Metropolitan Area Networks—Virtual Bridges Local Area Networks—Amendment: Equal Cost Multiple Paths (ECMP)," IEEE P802.1 Qbp/D0.3, Apr. 24, 2012, 66 pages.

Information Technology—Telecommunications and Information Exchange Between Systems—Intermediate System to Intermediate System Intra-Domain Routeing Information Exchange Protocol for Use in Conjunction with the Protocol for Providing the Connectionless-Mode Network Service (ISO 8473), ISO/IEC 10589, Second Edition, Nov. 15, 2002, 210 pages.

Lasserre, A., Ed., et al., "Virtual Private LAN Service (VPLS) Using Label Distribution Protocol (LDP) Signaling," RFC 4762, Jan. 2007, 28 pages.

Moy, J., et al., "Multicast Extensions to OSPF," RFC 1584, Mar. 1994, 91 pages.

Perlman, R., et al., "Routing Bridges (RBridges) : Base Protocol Specification," RFC 6325, Jul. 2011, 89 pages.

"Draft Standard for Local and Metropolitan Area Networks—Virtual Bridged Local Area Networks—Amendment: Equal Cost Multiple Paths (ECMP)," IEEE 802.1Qbp/D1.0, Jun. 20, 2012, 77 pages.

\* cited by examiner

FIG. 5 ively of any other patent application(s).

METHOD FOR MULTICAST FLOW ROUTING SELECTION

CROSS-REFERENCE TO RELATED APPLICATIONS

The present application claims priority to U.S. Provisional Patent Application No. 61/555,992 filed Nov. 4, 2011 by T. Benjamin Mack-Crane, et al, and entitled "Method for Multicast Flow Routing Selection," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Modern communication and data networks, such as Ethernet based networks, are comprised of nodes that transport data frames through the network. The nodes may include routers, switches, and/or bridges that transport the data frames through the network. Data frames may be delivered through the network as a multicast or unicast transmission. The multicast feature allows a single packet data to be copied and transmitted from a single multicast source node to multiple receiver nodes. Transmitting data using multicast flows may reduce the amount of traffic required to distribute data to many different receiver nodes.

Multicast flows may be delivered using different routing methods, such as head-end replication, source specific tree, or shared tree. More specifically, multicast flows may use multicast trees to forward data frames to different receiver nodes throughout the network. However, each network design generally supports only one type of routing method. For example, a Virtual Private LAN Service (VPLS) network may use head-end replication, a Shortest Path Bridge (SPB) network may use source specific trees, and a Transparent Interconnection of Lots of Links (TRILL) network may use shared trees. As a result, networks are limited to employing only one routing method, which causes inefficient use of bandwidth and consumption of resources required to manage multicast trees at a node.

Network designs may become more efficient by expanding the set of multicast routing methods supported in a network. Multicast transmission may be optimized while reducing the multicast state information through the utilization of multiple routing methods in a network. For example, by adding source specific trees to VPLS or creating a shared tree rooted at each multicast source node in TRILL, multicast traffic may be effectively distributed through a network. However, control mechanism needs to exist to support multiple routing methods simultaneously and appropriately apply the routing methods to different multicast flows. Unfortunately, no such control mechanism has been previously created for networks that support multicast traffic.

SUMMARY

In one embodiment, the disclosure includes a network component comprising a memory coupled to a processor, wherein the memory comprises instructions that cause the processor to select a first multicast routing mode from a plurality of multicast routing modes supported by a network comprising the network component, assign the first multicast routing mode to a first multicast flow, and advertise a first information frame to a first plurality of nodes, wherein the first information frame provides the assignment of the first multicast routing mode to the first multicast flow.

In another embodiment, the disclosure includes a network comprising a first multicast source node assigned a first multicast flow and a second multicast flow, and a plurality of receiver nodes coupled to the first multicast source node, wherein the first multicast flow and the second multicast flow are configured to multicast to the receiver nodes, wherein the first multicast flow is assigned to a first multicast mode, and wherein the second multicast flow is assigned a second multicast mode.

In yet another embodiment, the disclosure includes a method comprising selecting a plurality of root nodes, wherein the root nodes are used to calculate a plurality of shared trees, wherein a first shared tree comprises a plurality of nodes, selecting the first shared tree from the plurality of shared trees, and calculating a forwarding state that corresponds to the first shared tree at each node.

In yet another embodiment, the disclosure includes a network component comprising a memory coupled to a processor, wherein the memory comprises instructions that cause the processor to advertise a sub-type-length-value (sub-TLV) comprising a shared tree field that indicates an Backbone Service Instance Identifier (I-SID) endpoint uses a shared tree for multicast frames, and a tie-break mask that indicates the shared tree used for the I-SID endpoint.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a multicast routing system and method for assigning different multicast flows to different multicast routing modes in a network. Moreover, the multicast routing system and method ensures consistent multicast forwarding state calculation by all nodes for each multicast flow in the network. Source nodes or service endpoints may advertise tree calculation algorithms and roles in the multicast routing system. Nodes in the multicast routing system may calculate multicast forwarding states for multicast flows in a packet network. The multicast forwarding states for multicast flows may be based on multicast destination addresses and may be calculated according to the multicast routing mode and algorithms supported by a network design or technology. Multicast routing modes that may be used, but are not limited to, include head-end replication, source specific trees, and shared trees. The multicasting routing system and method enables applying multiple multicast routing modes simultaneously in a network by indicating the assignment of each multicast flow (e.g., a service instance) to one of the supported multicast routing modes.

Figure 1:
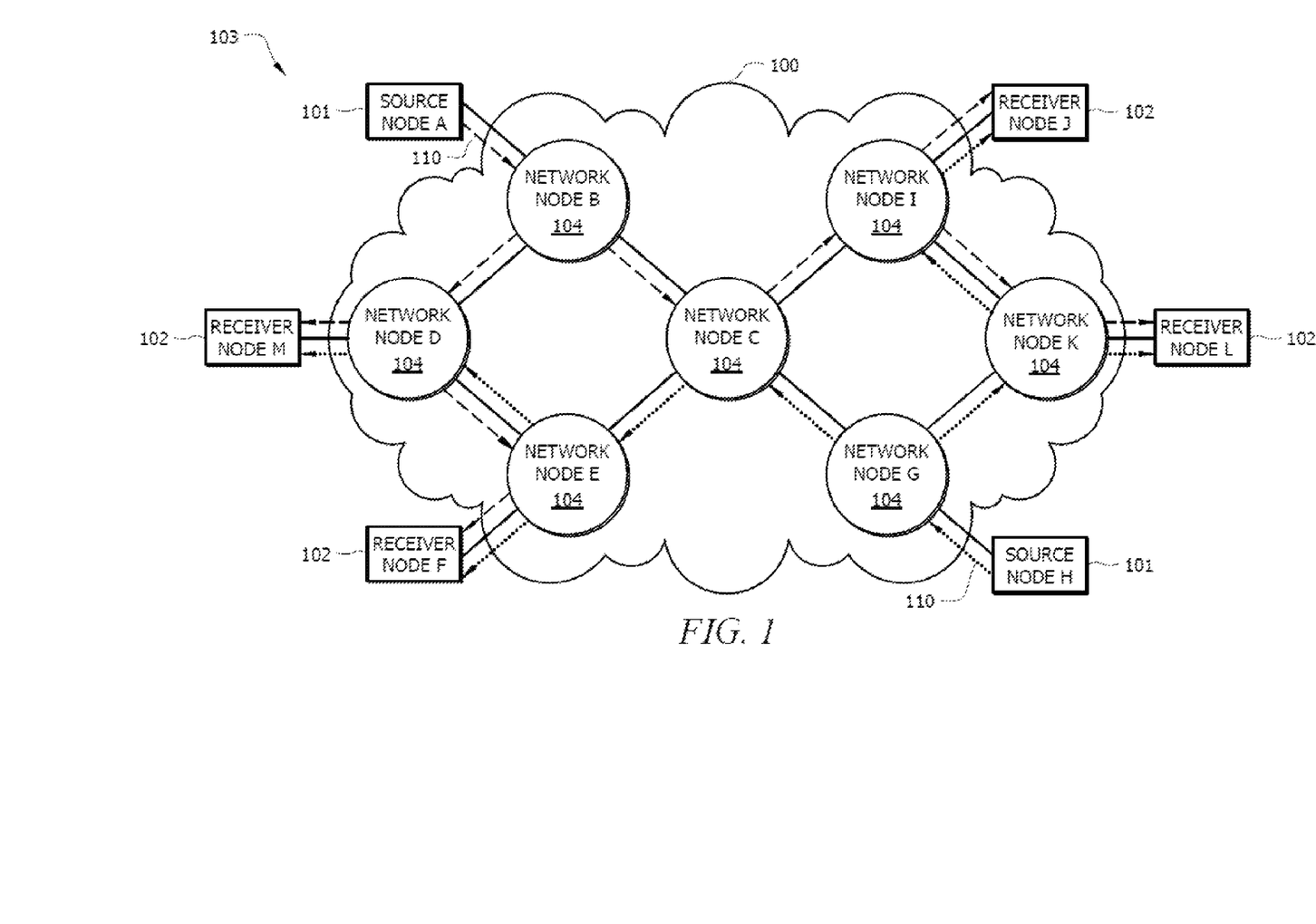
FIG. 1 is schematic diagram of an embodiment of a multicast routing system that provides multiple multicast routing modes simultaneously.

FIG. 1 is schematic diagram of an embodiment of a multicast routing system 103 that provides multiple multicasting routing modes simultaneously. Network 100 may be a packet network comprising one or more local area networks (LANs), virtual networks, and/or wide area networks (WANs). As shown in FIG. 1, network 100 may comprise a plurality of network nodes 104. Network nodes 104 may be coupled to a plurality of other network nodes 104, a plurality of source nodes 101, a plurality of receiver nodes 102, or any combination thereof. Source nodes 101 and receiver nodes 102 may be coupled to a plurality of network nodes 104, a plurality of other source nodes 101, a plurality other receiver nodes 102, or any combination thereof. In other embodiments, source nodes 101 and receiver nodes 102 may be present within network 100. Source nodes 101, receiver nodes 102, and network nodes 104 may be coupled together directly using physical (e.g., electrical or optical) links, wireless links, or indirectly, using a logical connection or physical links with intervening network nodes 104.

Source nodes 101, receiver nodes 102, and network nodes 104 may have many similar traits. Source nodes 101 may be any computational device, such as a router, cell phone, computer or other network devices that are capable of encoding data frames for transmission through the network. Source nodes 101 may be configured to send one or more data frames to multiple receiver nodes 102. Source nodes 101 may use a multicast flow to send the data frames to a multicast destination address. Implementation of the multicast flow depends on the selected multicast routing method (e.g., source specific tree). Receiver nodes 102 may be any computational device configured to subscribe to a multicast flow and receive multicast data from a source node 101. Source nodes 101 may also be configured to receive multicast data, while receiver nodes 102 may also be configured to send frames using multicast transmission. Network nodes 104 may be any network device that performs routings functions and supports routing protocols. Each network node 104 may maintain forwarding tables that determines the routes to forward data frames. Network nodes 104 may include bridges, switches, routers, or various combinations of such devices.

A multicast destination address may be used to determine the group of receiver nodes 102 that will receive data frames from a source node 101. For example, FIG. 1 may have receiver nodes F, J, L, and M 102 assigned to a multicast destination address "Y." Receiver nodes F, J, L, and M 102 would receive data frames when a multicasting transmission uses the multicast destination address "Y." However, other embodiments may have receiver nodes 102 with multiple multicast destination addresses. Using FIG. 1 as an example, receiver nodes F and J 102 may be assigned multicast destination address "Y," while receiver nodes L and M 102 may be assigned a multicast destination address "Z." Hence, receiver nodes F and J 102 would receive data frames when the multicast transmission uses the multicast destination address "Y," while receiver nodes L and M 102 would not receive these data frames. Persons of ordinary skill in the art will be aware that more than two multicast destination addresses may be used in the multicast routing system 103. An example of a multicast destination address may be a group MAC Address as described in the Institute of Electrical and Electronics Engineers (IEEE) 802.1aq-2012 standard, published Jun. 29, 2012, which is incorporated herein by reference.

Based on the multicast routing mode, data frames are transmitted from the source nodes 101, through network nodes B, C, D, E, G, and/or 104 to reach receiver nodes F, J, and M 102. In one embodiment, network 100 may have multicast flows assigned to different source specific trees that are rooted at one source node 101 (e.g. source node A 101). As such, the source node may have multicast flows with different multicast destination addresses. All nodes 101, 102, 104 in the multicast routing system 103 may calculate, based on the assigned multicast routing mode and algorithm, the multicasting forwarding states for each multicast flow to ensure the correct forwarding routes for data frames.

A multicast flow, such as a service instance, may use a multicast tree to map out the multicast transmission routes. Multicast routing modes and algorithms may be used to calculate the forwarding states for a multicast flow or a multicast tree. For example in a SPB or SPB-Media Access Control (MAC) mode (SPBM) network that uses source specific trees, the multicast tree may originate from at least one source node 101 to more than one receiver node 102 within the multicast routing system 103. Moreover, the SPBM network may compute the multicast flow or multicast trees using an Equal Cost Tree (ECT)-Algorithm, as described in 802.1aq-2012 standard. The ECT-Algorithm may be used to calculate forwarding states for all nodes on one of the shortest path tree (SPT). Source nodes 101 may advertise information indicating the multicast routing mode and route calculation. Receiving nodes 102 may advertise the requests to receive data traffic for the multicast flow.

Each multicast flow may be assigned a multicast destination address. In FIG. 1, receiver nodes F, J, L, and M 102 may be assigned to the multicast destination address "Y", and consequently belong to the same multicast flow. Moreover, source node A101 may also be assigned to the multicast destination address "Y." Another embodiment may have multiple multicast flows and multicast destination addresses assigned to source node A01. Using FIG. 1 as an example, receiver nodes F and J 102 may be assigned multicast destination address "Y," while receiver nodes L and M 102 may be assigned a multicast destination address "Z." Source node A 101 may have one multicast flow with multicast destination address "Y" and a second multicast flow with multicast destination address "Z." Persons of ordinary skill in the art will be aware that all nodes 101, 102, 104 in the multicast routing system 103 may be assigned to more than two multicast flows. Additionally, one embodiment may have each multicast flow assign one source node 101 to a multicast destination address, while another embodiment may assign multiple source nodes 101 to one multicast destination address.

All nodes 101, 102, 104 in the multicast system 103 may be assigned a plurality of multicast flows, with each multicast flow assigned to a multicast routing mode. One embodiment may have all multicast flows assigned to the same multicast routing mode (e.g., source specific trees), while another embodiment may have multicast flows assigned to different routing modes. For example, source node A 101 may have one multicast flow assigned to the source specific tree routing mode, while a second multicast flow is assigned to a shared tree multicast routing mode. All nodes 101, 102, and 104 in the multicast system 103 may be configured to support all multicast routing modes. Multicast routing modes that may be used, but are not limited to, include head-end replication, source specific trees, and shared trees.

In head-end replication, source nodes 101 may send multiple unicast data frames, one to each receiver nodes 102 in the multicast routing system 103, instead of sending one data frame using a multicast destination address. Head-end replication may preclude the use of multicasting forwarding states. Source nodes 101 using head-end replication may be configured to indicate no multicast transmission, and the network nodes 104 may not have multicast forwarding states installed for the related multicast addresses. A source node 101 using head-end replication may advertise that it wishes to receive multicast frames from other source nodes 101 since other source nodes 101 may still be using other multicasting routing modes that require multicasting forward states. Source nodes 101 may be assigned to use head-end replication to multicast data frames to receiver nodes 102 when directly linked to the source nodes 101 or when source nodes 101 are leaf nodes in a rooted multipoint service.

As shown in FIG. 1, network 100 forwards data frames from source nodes 101 to receiver nodes 102 using the source specific tree multicast routing mode. The source specific multicast routing mode creates two different multicast flows 110, one for source node A 101 and a second for source node H 101. When the source specific tree multicast routing method is assigned to the two different multicast flows 110, multicast trees are calculated to route data frames from a given source node 101 to multiple receiver nodes 102 that have the same multicast destination address. Assume that receiver nodes F, J, L, and M are assigned a multicast destination address "Y." The first multicast flow 110 may be assigned to source node A 101 and routes data frames through network nodes B, C, E, I, and K 104 to receiver nodes F, J, L, and M 102. The second multicast flow 110 may be assigned to source node H 101 and routes data frames through network nodes, C, D, E, G, I, and K 104 to receiver nodes F, J, L, and M 102. Paths created using source specific trees may be shortest path trees (SPT) as found in SPB or SPBM networks, which are described in the IEEE 802.1aq-2012 standard. Multicast frames may be transmitted using group MAC addresses to transmit the frames and may not need an additional destination address or an additional identifier nickname) for nodes within a network. Furthermore, the different multicast trees that support multicast flows 110 assigned to source node A 101 and source node H 101 may require different source specific addresses to indicate unique multicast destination addresses. For example, source node A 101 may be assigned a source specific address of "A," while source node H 101 may be assigned a source specific address of "H." Hence, the multicast destination address for source node A may be denoted as "(A, Y)," while the multicast address for source node H may be denoted as "(H, Y)."

Multiple source specific trees may be supported for a given source node 101 (e.g., source node A). A standard hash or pseudo-random assignment algorithm may be used to determine the assignment of a multicast flow 110 for one of the source specific trees. This may enable all nodes (e.g., network nodes 104, source nodes 101, and receiver nodes 102) in the network to calculate the same assignment and produce consistent multicast forwarding state. Additionally, the source specific tree routing mode may include a tie-breaking algorithm for selecting a route among equal cost trees. The tie-breaking method will be discussed in more detail later.

Figure 2:
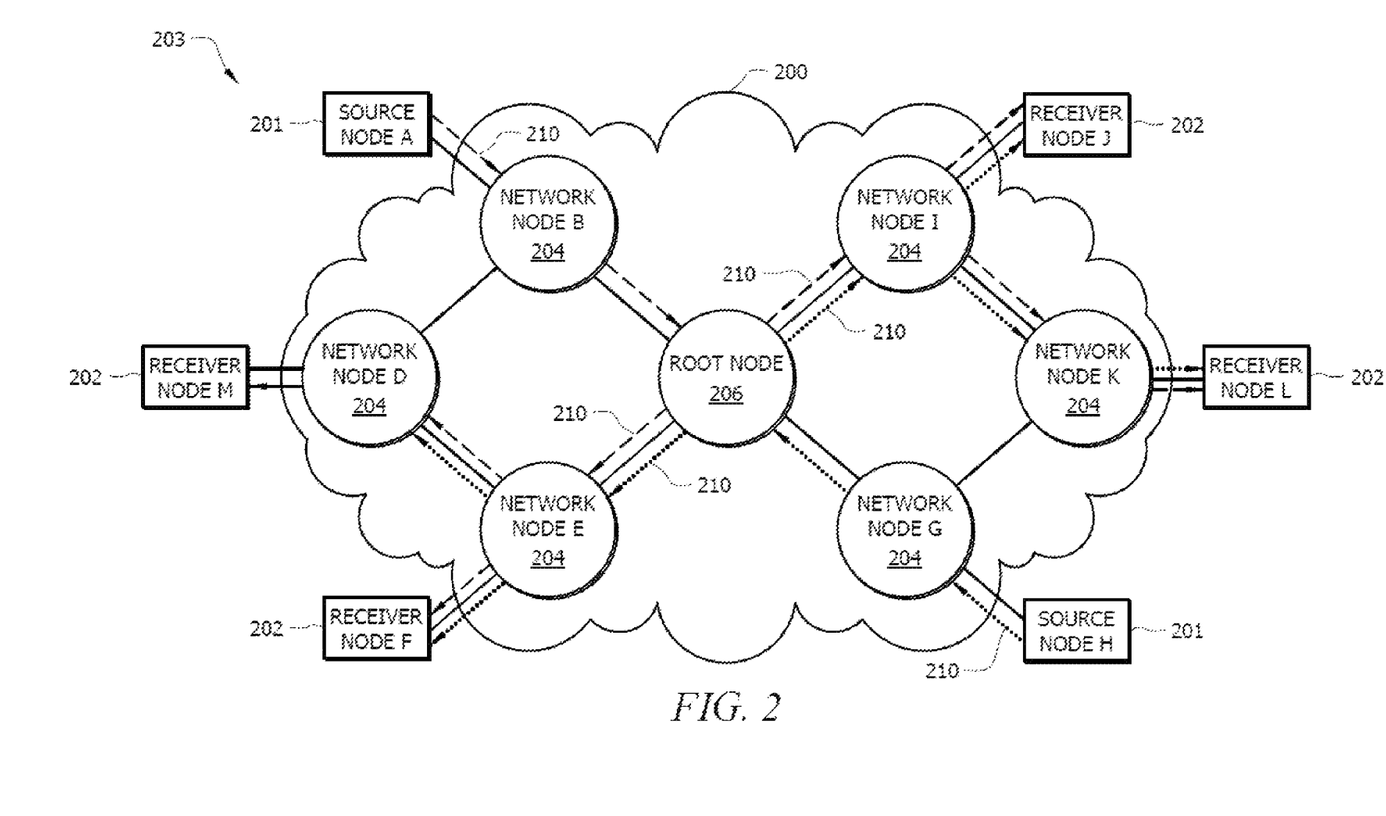
FIG. 2 is a schematic diagram of an embodiment of a multicast routing system where multicast is implemented using the shared tree multicast routing mode.

FIG. 2 is a schematic diagram of an embodiment of a multicast routing system 203 where multicast is implemented using the shared tree multicast routing mode. In the shared tree multicast routing mode, one shared tree may be built using a root node 206. A designated root node 206 may be a network node 204, source node 201, or receiver node 202 within the network 200. A root node 206 may be selected for a shared tree. A plurality of multicast flows 210 may use the shared tree to multicast data frames. The shared tree may limit or constrain the routes available to the multicast flows 210 to multicast data frames. FIG. 2 illustrates two multicast flows that are assigned to the shared tree using root node 206. The multicast flow 210 originating from source node A 201 may route data frames through the shared tree using root node 206 and network nodes B, D, E, I, and K 204 to receiver nodes F, J, L, and M 202. The second multicast flow 210 originating from source node H 201 may route data frames through the shared tree using root node 206 and network nodes D, E, C, and K 204 to receiver nodes F, L, and M 202. A second embodiment may have multicast flows 210 configured to route data frames to receiver nodes 202 without traveling through root node 206. Moreover, a third embodiment may have source node A 201 and source node H 201 assigned to one multicast flow 210.

The shared tree multicast routing mode may include a method for selecting the most efficient root nodes, selecting how many and which shared trees are to be used, and a method for assigning multicast flows to specific multicast trees. Additional information regarding shared trees may be advertised to all nodes (e.g., network nodes 204, source nodes 201, and receiver nodes 202) to calculate multicast forwarding states. For example, each selected root node 206 for a shared tree may advertise itself as a shared tree root node 206 and advertise the algorithm to be used to calculate the shared tree from the root node 206. Once a node receives advertisement frames from the root node, each node may use the advertisement frame to calculate forwarding states. Additionally, receiver nodes 202 may advertise its desire to receive each multicast flow. Alternatively, a well-defined algorithm may be used to select root nodes and calculate shared trees so that each node may perform the same calculation to determine the set of shared trees available in the network. Assignment of each multicast flow to one of the shared trees may be governed by a standard hash assignment algorithm or by an advertised assignment. A variety of algorithms may be used to select root nodes and calculate shared trees. Use of an assignment algorithm enables each node to independently calculate the assignment and reach the same results.

Figure 3:
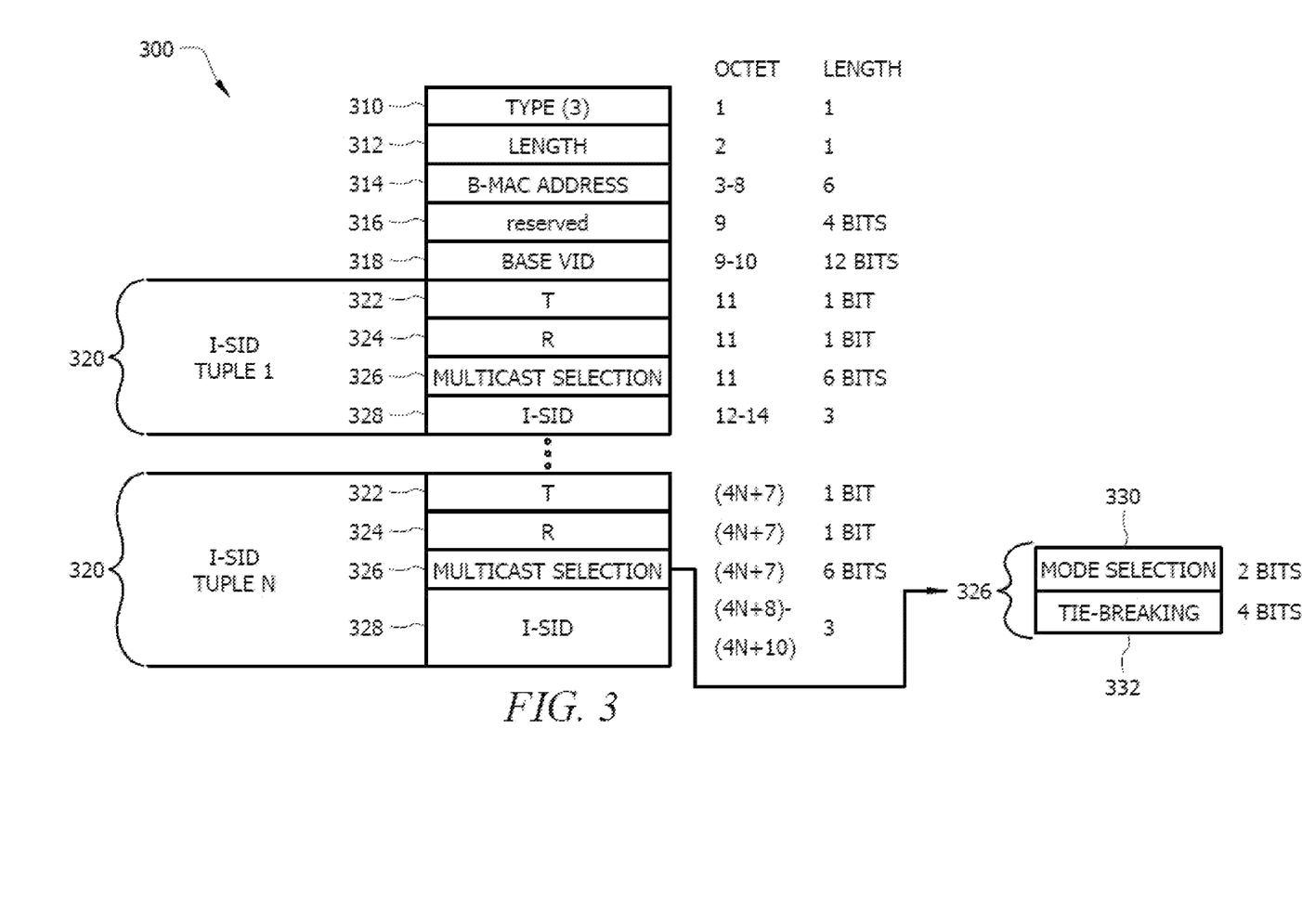
FIG. 3 is a diagram describing the elements and size of an embodiment of a multicast advertising sub-type-length-value (TLV) for a Shortest Path Bridging (SPB) network.

Different multicast routing modes may be assigned to different multicast flows in a network. Multicast mode assignment may be provided by augmenting the advertisement of sources nodes 201. For example, an advertisement sub-TLV in a SPB or SPBM network, as described in IEEE 802.1aq-2012 standard, may configure a Backbone Service Instance Identifier (I-SID) tuple to include information that indicates the multicast routing mode and route calculation to be used for multicast data frames from that multicast source. FIG. 3 is a diagram describing the elements and size of an embodiment of a multicast advertising sub-TLV 300 for a. SPB or SPBM network. The multicast advertising sub-TLV 300 may be carried in a TLV that is encoded within a protocol data unit (PDU) (e.g., an Ethernet frame or IP packet). The TLV may comprise a TLV header followed by at least one sub-TLV segments. The multicast advertising sub-TLV 300 may be one type of sub-TLV segment encoded in the TLV and may be encoded at least once in the TLV. The PDU may comprise a header, as described in the international Standard (ISO) 10589, followed by at least one TLV segment. A PDU may comprise of multiple TLV segments. The multiple TLV segments may be different types of TLV segments, the same type of TLV segments, or a combination of the TLV segments. The TLV segment carrying the multicast advertising sub-TLV 300 may exist at least once within the PDU. Art example of a multicast advertising sub-TLV 300 may be a modified SPBM service identifier and unicast address sub-type-length-value (TLV) carried in a Multi-Topologies (MT)-Capability TLV within a Link State PDU.

The multicast advertising sub-TLV 300 may comprise a type element 310, a length element 312, a Backbone Media Access Control (B-MAC) address 314, a reserved element 316, base Virtual LAN identifier (VID) 318, and a plurality of Backbone Service Instance Identifier (I-SID) tuples 320. The type element 310 may be about eight bits and may contain the value of three to distinguish the information as the multicast advertising sub-TLV. The length element 312 may be about eight bits and indicates the total number of bytes contained in the payload. The B-MAC address 314 may be about 48 bits and may contain an individual MAC address for a given node. The reserved element may be about four bits and may be reserved for other purposes. The base VID 318 may be about 12 bits and identifies the base VID associated with the I-SIDs defined in the plurality of I-SID tuples.

The I-SID tuple 320 may comprise a transmit (T) bit element 322, a receive (R) bit element 324, a multicast selection 326, and I-SID element 328. The T bit element 322 may be about one bit and when set enables transmission for the I-SID found in the I-SID element 328. The R bit element 324 may be about one bit and when set enables receiving for the I-SID found in the I-SID element 328. Both the T bit element 322 and R bit element 324 may be set simultaneously tier a given node. The multicast selection 326 element may be about six bits and may comprise a mode selection 330 element and a tie breaking 332 element. The mode selection 330 element may be about two bits and be used to select multicast routing mode (e.g., source specific tree). The tie-breaking 332 element may be about four bits and used to select the multicast tree used to multicast data frames. A second embodiment of the multicast selection 326 element may be about five bits and may comprises a Ts bit and the tiebreaking 332 element. The Ts bit may indicate the use of a shared tree for multicast frames. The multicast selection 326 element will be discussed in further detail later. The I-SID 328 may be about 24 bits and indicates the group service membership identifier (i.e., service endpoint identifier). In a SPBM network, the multicast advertising sub-TLV may use MAC addresses to transmit the sub-TLVs and may not use a destination address or an identifier (i.e., nickname) for nodes within a network.

The multicast advertising sub-TLV 300 may be used to indicate the assignment of each multicast flow to one of the supported multicast routing modes. The multicast advertising sub-TLV 300 indicates whether the multicast source will use head-end replication (i.e., no multicast state is needed in the SPB network), a source specific tree, or a shared tree. If a shared tree is indicated, a single multicast destination address may be used by a set of source nodes participating in a multicast group. A shared tree may be used to create multicast flow for multiple source nodes. The multicast destination address may be advertised or determined using canonical or standard address assignment scheme. If a source specific tree is indicated, each source node may need a unique multicast destination address to avoid conflict with multicast state from other source nodes. Similar to shared trees, the multicast address may be advertised or determined from a canonical or standard scheme.

The multicast selection 326 element may comprise a mode selection 330 element used to assign a multicast flow to one of the multicast routing modes. The mode selection 330 element may be about two bits and may be a scalar value. For example, a two bit field for the two least significant bits may be assigned to the following encoding: "00" for the network default multicast routing method; "01" for the specific source tree multicast routing mode; "10" for the shared tree multicast routing mode, and "11" for the head-end replication multicast routing mode. The network default multicast routing method may be a multicast routing mode and algorithm that applies to all multicast flows in the network that do not have a more specific assignment advertised. The network default multicast routing method may be a specific multicast routing mode and algorithm or a method of random assignment, such as assignments based on a well-known hash algorithm. For example, in a SPB network, the ECT-Algorithm, as described in IEEE 802.1aq-2012 standard, may be used for a given VLAN by advertising in the SPB Base VID sub-TLV. The definition of an ECT-Algorithm may include a default multicast routing method. A default assignment may be useful in networks in which a relatively small number of multicast flows require specific multicast routing method assignment. Any remaining flows may use the default multicast routing method.

In an alternative embodiment, when the T Bit element 322 is set to a data value "1," the paths for a tree may be computed using the ECT-Algorithm in the source specific tree multicast routing mode. The mode selection 330 element may be about two bits long and comprise a Ts element and a reserved element. Both the Ts and reserved element may be one bit long. The Ts element may be set to a "1" data value to elect the shared tree multicast routing mode. The reserved element may be reserved for other purposes. If the T bit element and Ts element are both set to "1," the Ts element may take precedent and select the shared tree multicast routing mode for the multicast flow.

Figure 4:
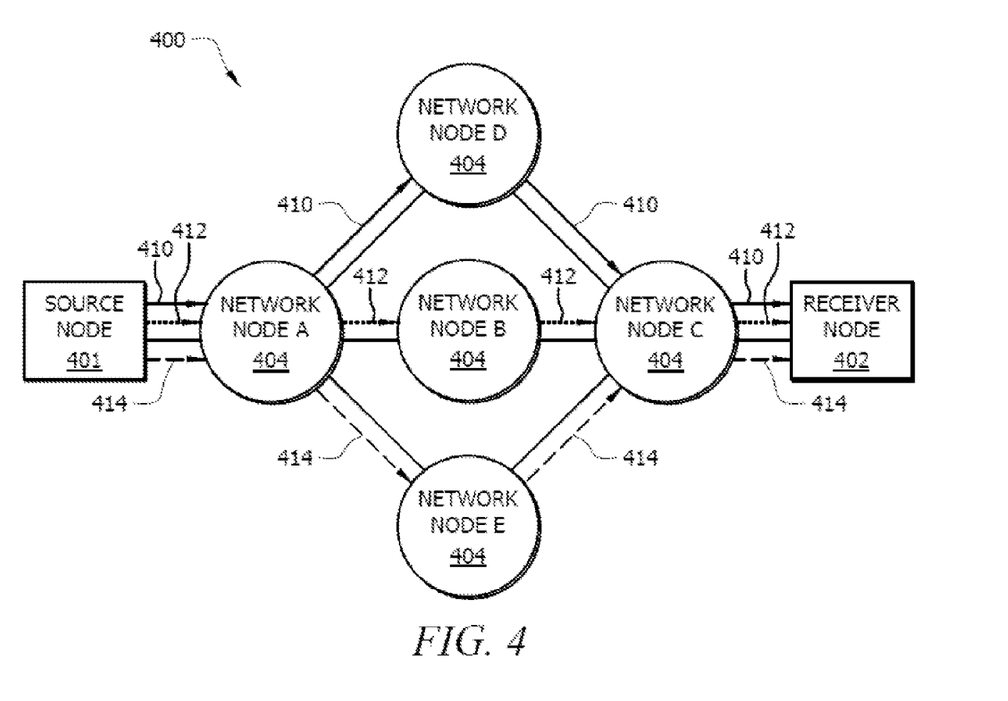
FIG. 4 is a schematic diagram of an embodiment of a network with equal cost paths.

FIG. 4 is a schematic diagram of an embodiment of a network 400 with equal cost paths for source node 401 to a receiver node 402. Source node 401 may be coupled to a plurality of network nodes 404 that create three different but equal cost paths to receiver node 402. The first route 410 travels from source node 401 through network nodes A, D, and C 404 to reach receiver node 402. The second route 412 travels from source node 401 through network nodes A, B, and C 404 to reach receiver node 402. The third route 414 travels from source node 401 through network nodes A, E, and C to reach receiver nodes 402.

The multicast selection 326 element may comprise a tie-break 332 element that may indicate additional options within a multicast mode. In one embodiment, a source specific tree multicast routing mode may use the tie-break 332 element to support up to 16 source specific trees per node by using 16 different tie-break masks in calculating the source specific tree. The tie-break masks may be different bit combinations that are within the tie-break 332 element. The tie-break mask may be used to select from the set of equal cost parents for each node in an SPT. Using FIG. 4 as an example, the first route 410 may be selected by one of the tie-break masks (e.g., "0001"), while the second route 412 and third route 414 are selected by two other tie-break masks (e.g., "0010" and "0011"). A four bit value of "0000" may indicate the default tie-breaker for the ECT-Algorithm and the network default multicast routing method. Therefore, the network default multicast routing method may be indicated when the multicast selection 326 element is not set (e.g., "000000"). A source node 401 (e.g., I-SID endpoints in an SPB network) may be assigned to a particular source specific tree or a particular shared tree by configuring the tie-break mask.

Another embodiment may reduce the multicast forwarding states by using the shared tree multicast routing mode. The tic-break 332 element may use the 16 tie-break masks to configure up to 16 different shared trees. For shared trees, the tie-break mask is used to both select a root node and to select from the set of equal cost parents for each node in the tree. A node may be assigned to a shared tree by setting the mode selection 330 element to a "10" data value and configuring the tie-break mask to identify the shared tree. The tie-break element may be repeated to form a 64 bit mask used in selecting a node identifier (e.g., a low Bridge Identifier) from a set of node identifiers Bridge identifiers). The selection process may be used in multicast tree calculations to select a shared tree root node and select parent nodes in SPTs where equal costs paths are available. Source nodes 401 that transmit on a shared tree use the same multicast destination address for a given multicast flow and share the forwarding state used for that multicast flow.

Figure 5:
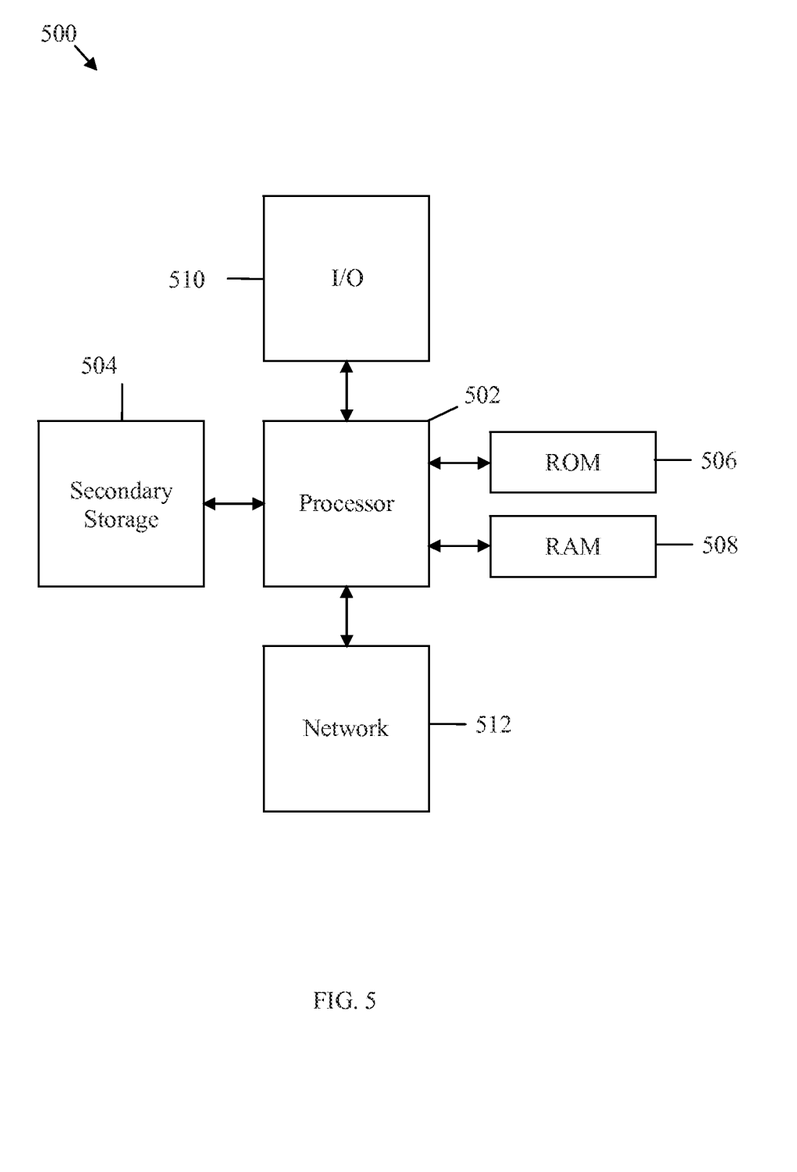
FIG. 5 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 5 illustrates a typical, general-purpose network component 500 that may correspond to or may be part of a network component, such as a server, a switch, a router, or any other network nodes. The network component 500 includes a processor 502 (which may be referred to as a central processor unit or CPU) that is in communication with memo devices including secondary storage 504, read only memory (ROM) 506, random access memory (RAM) 508, input/output (110) devices 510, and network connectivity devices 512. The general-purpose network component 500 may also comprise, at the processor 502 and or any of the other components of the general-purpose network component 500.

The processor 502 may be implemented as one or more CPU chips, or pray be part of one or more application specific integrated circuits (ASICs) and/or digital signal processors (DSPs). The processor 502 may comprise a central processor unit or CPU. The processor may be implemented as one or more CPU chips. The secondary storage 504 is typically comprised of one or more disk drives or tape drives and is used for non-volatile storage of data and as an over-flow data storage device if RAM 508 is not large enough to hold all working data. Secondary storage 504 may be used to store programs that are loaded into RAM 508 when such programs are selected for execution. The ROM 506 is used to store instructions and perhaps data that are read during program execution. ROM 506 is a non-volatile memory device that typically has a small memory capacity relative to the larger memory capacity of secondary storage 504. The RAM 508 is used to store volatile data and perhaps to store instructions. Access to both ROM 506 and RAM 508 is typically faster than to secondary storage 504.

The secondary storage 504 is typically comprised of one or more disk drives or tape drives and is used for on-volatile storage of data and as an over-flow data storage device if RAM 508 is not large enough to hold all working data. Secondary storage 504 may be used to store programs that are loaded into RAM 508 when such programs are selected for execution. The ROM 506 is used to store instructions and perhaps data that are read during program execution. ROM 506 is a non-volatile memory device that typically has a small memory capacity relative to the larger memory capacity of secondary storage 504. The RAM 508 is used to store volatile data and perhaps to store instructions. Access to both ROM 506 and RAM 508 is typically faster than to secondary storage 504.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude flitting within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k(R_u-R_l)$, wherein k is a variable ranging from 1 percent to 100 percent with a 1 percent increment, i.e., k is 1 percent, 2 percent, 3 percent, 4 percent, 7 percent, 70 percent, 71 percent, 72 percent, 97 percent, 96 percent, 97 percent, 98 percent, 99 percent, or 100 percent. Moreover, any numerical range defined by two R numbers as defined in the above is also specifically disclosed. The use of the term about means ±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of and comprised substantially of. Accordingly, the scope of protection is not limited by the description set out above but is defined by the claims that follow, that scope including all equivalents of the subject matter of the claims. Each and every claim incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated the various embodiments as discrete or separate may be combined or integrated with other systems, modules, techniques, or methods without departing from the scope of the present disclosure. Other items shown or discussed as coupled or directly coupled or communicate with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A network component comprising:
a memory coupled to a processor, wherein the memory comprises instructions when executed by the processor causes the network component to:
select a first multicast routing mode from a plurality of multicast routing modes supported by a network comprising the network component;
assign the first multicast routing mode to a first multicast flow; and
advertise a first information frame to a plurality of first nodes within the network,
wherein the first information frame provides an assignment of the first multicast routing mode to the first multicast flow,
wherein the first multicast flow represents a flow of data packets that travels from a source node of the first plurality of nodes to a plurality of receiver nodes of the first plurality of nodes,
wherein the first information frame comprises a tie-break field that indicates a tree path determined using the first multicast routing mode,
wherein the tie-break field provides for a default tree,
wherein the default tree indicates an Equal Cost Tree (ECT)-Algorithm is used to create the tree path, and
wherein the multicast routing modes represent different types of routing modes used to determine one or more multicast forwarding routes for at least the first multicast flow within the network.

2. The network component of claim 1, wherein the instructions, when executed by the processor, further cause the network component to:
select a second multicast routing mode from the multicast routing modes supported by the network;
assign the second multicast routing mode to a second multicast flow; and
advertise a second information frame to a plurality of second nodes,
wherein the second information frame provides an assignment of the second multicast routing mode to the second multicast flow.

3. The network component of claim 2, wherein the first multicast routing mode and the second multicast routing mode are different multicast routing modes such that the first multicast routing mode calculates a plurality of forwarding states for the first nodes differently than how the second multicast routing mode calculates a plurality of states for the second nodes.

4. The network component of claim 1, wherein the information frame comprises a multicast selection field that indicates the first multicast routing mode assigned to the first multicast flow.

5. The network component of claim 4, wherein the multicast selection field provides for a default routing mode, and wherein the multicast selection field is about two bits long.

6. The network component of claim 4, wherein the multicast selection field indicates a head-end replication routing mode, a source specific tree routing mode, or a shared tree routing mode is assigned to the first multicast flow.

7. The network component of claim 1, wherein the tie-break field is about four bits long.

8. The network component of claim 1, wherein the receiver nodes advertise a request data frame to receive data from the first multicast flow.

9. The network component of claim 1, wherein the information frame is a modified Shortest Path Bridging Media Access Control (SPBM) servicer identifier and Unicast Address sub-type-length-value (sub-TLV) that further comprises a multicast selection field and a tie-break field.

10. A network component comprising:
a memory coupled to a processor, wherein the memory comprises instructions when executed by the processor causes the network component to:
select a selected multicast mode from a plurality of multicast modes for multicast routing;
assign the selected multicast mode to a multicast flow; and
advertise a sub-type-length-value (sub-TLV) that indicates an assignment of the selected multicast mode for the multicast flow,
wherein the sub-TLV comprises:
a shared tree transmit indication (Ts) bit that indicates a Backbone Service Instance Identifier (I-SID) endpoint uses a shared tree for multicast frames; and
a tie-break mask that indicates the shared tree used for the I-SID endpoint,
wherein the multicast flow corresponds to a flow of data packets from an I-SID source to a plurality of I-SID receivers within the network,
wherein each of the multicast modes represents a different routing mode used to determine a multicast path used to route packets for the multicast flow, and
wherein a tree is constructed corresponding to an Equal Cost Tree (ECT)-Algorithm between the I-SID source and any I-SID receiver that have a same group service membership identifier.

11. The network component of claim 10, wherein the sub-TLV further comprises a transmit allowed (T) bit that indicates the I-SID endpoint is the I-SID source for Group Media Access Control (MAC) addresses, a multicast receive indication (R) bit that indicates the I-SID endpoint is a I-SID receiver for the Group MAC addresses, and an I-SID field that indicates a group service membership identifier.

12. The network component of claim 10, wherein the Ts bit takes precedence when the T bit is set and the Ts bit is set.

13. The network component of claim 10, wherein tie-break mask is about four bits long, wherein the Ts bit is about one bit long, wherein a transmitter field is about one bit long, wherein a receiver field is about one bit long, and wherein an I-SID field is about 24 bits long.

14. The network component of claim 13, wherein the tie-break mask is repeated to form a 64-bit mask used in selecting a low bridge identifier from a set of bridge identifiers, and wherein a selection process is used in one or more multicast tree calculations to select a shared tree root bridge and a plurality of parent nodes in Shortest Path Trees (SPTs) when equal cost paths are available.

15. A method for multicast transmission comprising:
selecting one of a plurality of multicast modes supported by a network for multicast routing;
assigning the one of the plurality of multicast modes to one of a plurality of multicast flows within the network;
determining a multicast route to transport data for the one of the plurality of multicast flows using the one of the multicast modes;

advertise a first information frame to a plurality of destination nodes within the network, wherein the one of the plurality of multicast flows corresponds to a flow of data packets from a source node to the destination nodes within the network, wherein each of the multicast modes supported by the network represents a different routing mode that governs the multicast route used to route packets for the one of the plurality of multicast flows, wherein the first information frame comprises a tie-break field that indicates a tree path determined using a first multicast routing mode, wherein the tie-break field provides for a default tree, and wherein the default tree indicates an Equal Cost Tree (ECT)-Algorithm is used to create the tree path.

16. The method of claim 15, wherein the plurality of multicast modes comprises a source rooted shortest path tree (SPT), a shared tree, and a head-end replication.

17. The method of claim 16, further comprising:

assigning a tie-break mask when the one of the plurality of multicast modes is selected as either the source rooted SPT or the shared tree; and selecting the multicast route using the tie-break mask from a plurality of equal cost paths when the one of the plurality of multicast modes is selected as either the source rooted SPT or the shared tree.

18. The method of claim 16, further comprising transmitting a unicast frame to each of the destination nodes instead of sending a group addressed frame when the one of the plurality of multicast modes is selected for the head-end replication.

* * * * *